Nov. 8, 1955 G. S. KRAJIAN 2,722,762
MEANS FOR CONVEYING VISUAL INDICATIONS
IN TRANSPARENT MATERIALS
Filed Sept. 4, 1951
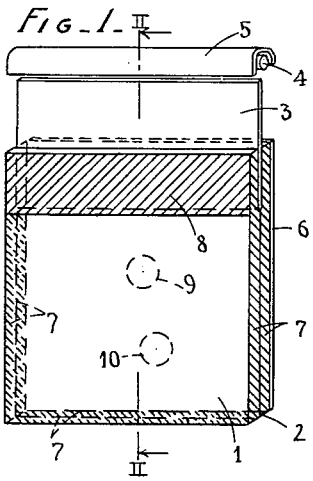
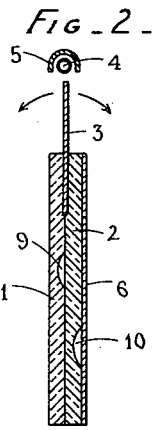
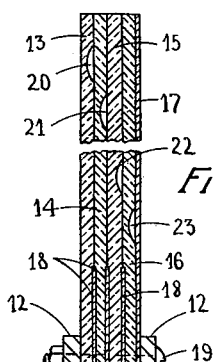
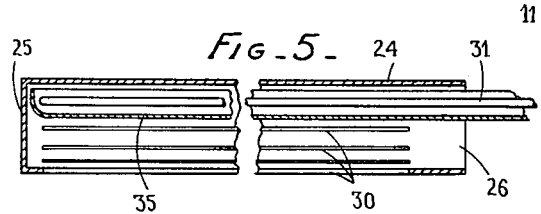
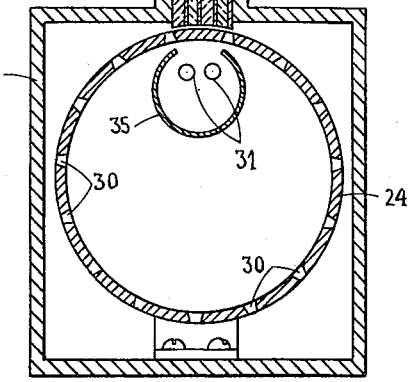
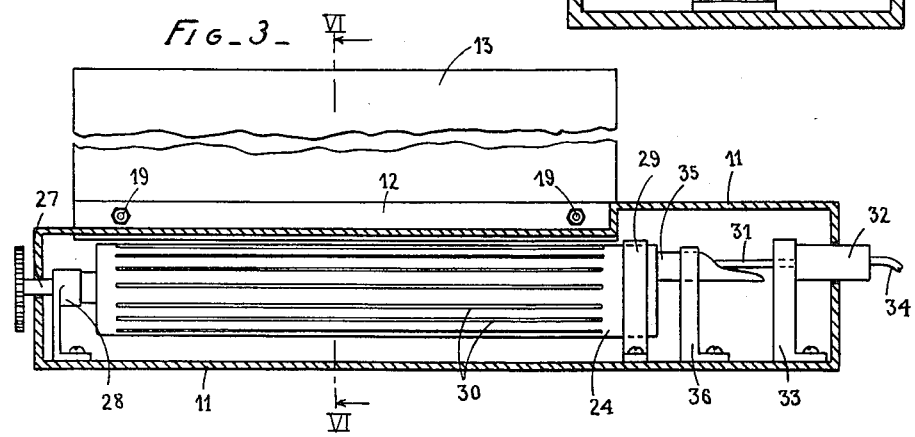
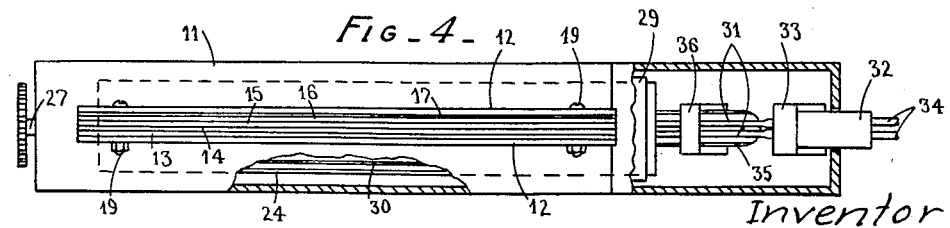
Inventor
George Sarkis Krajian
By Robert E. Burns
Attorney

United States Patent Office 2,722,762
Patented Nov. 8, 1955

2,722,762

MEANS FOR CONVEYING VISUAL INDICATIONS IN TRANSPARENT MATERIALS

George S. Krajian, Eastbourne, Wellington, New Zealand

Application September 4, 1951, Serial No. 244,944

Claims priority, application New Zealand September 8, 1950

6 Claims. (Cl. 40—130)

The invention relates to apparatus for producing visual indications in transparent material.

An object of the invention is to provide improved apparatus for producing visual indications for commercial, educational, amusement or other display purposes, the indications being so presented as to have the appearance of animation or otherwise to be made attractive as by colour variation.

The apparatus according to the invention comprises at least two layers of transparent material each bearing an indication required to be made visible, a source of light, and means for controlling the piping of light rays from the said source edgewise into the layers so that the indications on the layers are made visible individually at choice, or in sequence, or collectively.

The indications to be made visible by the illumination and which may be referred to as the matter to be displayed, are applied to a face of each of the layers and may be produced in any suitable manner as by carving, intaglio, printing engraving, dry-point etching, abrading, sand blasting, painting, silk screening, spraying or by the use of adhesive transfers.

The layers can be made of any suitable transparent material such as glass or a clear type of synthetic resin, for example, methyl methacrylate or cellulose acetate.

The invention will be further explained with the aid of the accompanying drawings, in which:

Figure 1 is a perspective view illustrating apparatus in accordance with the invention in one of its simplest forms;

Figure 2 is a sectional view on the line II—II of Figure 1;

Figure 3 is a front elevational view, partly in section, of a more elaborate form of the apparatus;

Figure 4 is a plan view, partly in section corresponding to Figure 1;

Figure 5 is a longitudinal sectional view of part of the apparatus according to Figures 3 and 4, and Figure 6 is a cross-sectional view to an enlarged scale on the line VI—VI of Figure 3.

The construction illustrated in Figure 1 comprises two layers 1 and 2 of transparent material arranged vertically and suitably held in facewise contact. A mask 3 of flexible opaque material such as spring sheet metal is arranged between the upper parts of the meeting faces of the two layers, and protrudes vertically above the upper edges of the two layers so that the protruding portion of the mask is free to be flexed to one side or the other as indicated by the arrows in Figure 2.

A source of light, such as an electric strip lamp 4 is arranged adjacent the upper edge of the mask 3, the lamp being fitted with a shield 5 which acts to direct the light rays downwardly onto the upper edges of the transparent layers 1 and 2. The inner surface of the shield 5 may be polished so that it acts as a reflector.

The outer face of the layer 2 is covered by a sheet 6 of opaque material which may have reflective characteristics, the outer face of the layer 1 then constituting the viewing face. In some applications, the sheet 6 may be dispensed with, in which case both the outer face of the layer 1 and the outer face of the layer 2 will constitute viewing faces.

The side and bottom edges of the two layers 1 and 2 are preferably sealed as indicated by the cross-hatch lines 7 in Figure 1, to prevent light from one layer leaking into another layer when the protruding part of the mask 3 is manipulated for the purpose to be explained. Such sealing may be effected by applying opaque aluminium or other reflective type of paint to the said edges, or by mounting the layers in a U-shaped frame of metal or other suitable opaque material. Where a frame is used for the purpose this may also serve to hold the two layers together. It may also be desirable to suitably seal, as indicated by the cross-hatch lines 8, the part of the viewing face of the layer 1 lying opposite the portion of the mask 3 which is sandwiched between the layers, so as to hide the sandwiched portion of the mask.

In the embodiment illustrated in Figure 1, matter to be displayed is applied to the inner face of the layer 1 as indicated at 9, while further matter to be displayed is applied to the outer face of the layer 2 lying against the sheet 6, as indicated at 10. In an alternative arrangement, (not illustrated), the part 9 of the matter to be displayed is applied to the layer 1 as just described, while the other part 10 is applied to the adjoining inner face of the layer 2.

To use the arrangement illustrated in Figures 1 and 2, the lamp 4 is illuminated and the protruding part of the mask 3 is flexed to one side of the vertical say to the right-hand side, so that the light rays from the lamp are free to enter the layer 1 through the upper edge thereof, while light is masked against entry into the layer 2 through the upper edge of the latter. Thus the matter 9 on the layer 1 is illuminated and can be seen through the viewing face of this layer while the matter 10 on the layer 2 is in shadow or darkness and remains invisible or substantially so. When the protruding part of the mask 3 is flexed in the opposite direction, that is to say to the left, passage of light rays to the layer 1 will be obturated and the layer 2 will receive the rays so that the matter 10 on the layer 2 will be illuminated and become visible through the viewing face of the layer 1, while the matter 9 on the layer 1 will be in shadow or darkness.

The protruding part of the mask may be flexed manually, electrically or mechanically.

The upper edges of the layers 1 and 2 through which the light rays are adapted to pass may be coloured, the colour being uniform or differing between one edge and the other.

The construction illustrated in Figures 3 to 6 comprises a casing 11 provided at the top with two upstanding flanges 12 which extend longitudinally of the casing and are spaced from each other. The space between the flanges 12 accommodates the lower portions of a plurality of vertically extending layers of transparent material, each of the same thickness. By way of example, four such layers are shown, these being marked 13, 14, 15 and 16. The layers are arranged face-to-face, the exposed face of the layer 13 constituting the viewing face and the exposed face of the layer 16 being covered by a sheet 17 of opaque material which may be reflective. In some applications this sheet may be dispensed with in which case the outer faces of the layers 13 and 16 will both constitute viewing faces.

The lower edges of the layers extend for a short distance into the casing 11 and, over the lower portions of the several layers, one layer is sealed from its neighbour by a mask 18 of opaque material such as aluminium or tin foil, the masks extending upwardly from the lower edges of the layers, and terminating at a point situated at a short distance above the upper edges of the flanges 11.

The purpose served by the masks 18 will be explained later.

The layers 13 and 16 of transparent material, the opaque backing 17 and the masks 18 are held firmly together by means of clamping bolts 19 which pass through holes in the flanges 12 and through corresponding holes in the assembly of layers, backing and masks.

Above the upper edges of the masks 18, each layer of transparent material carries matter to be displayed as indicated at 20, 21, 22 and 23.

Within the casing 11 and beneath the lower edges of the transparent layers 13 to 16 there is provided a hollow drum 24 having one end closed as indicated at 25 and the other end open as indicated at 26. The drum is mounted for rotation about an axis extending in the direction of the width of the transparent layers 14 to 16 and lying in a plane passing vertically and centrally through the combined thickness of the transparent layers. To this end, the closed end 25 of the drum is provided with a shaft 27 journalled for rotation in a bearing 28, while the opposite end of the drum is journalled for rotation in a ring bearing 29. The shaft 27 is fitted with a toothed wheel through the medium of which the drum can be rotated manually by means of a hand-crank or mechanically by means of an electric motor or other suitable form of power unit (not shown).

The drum 24 is of such diameter that its outer curved surface lies close to the lower edges of the layers 14 to 16, and the cylindrical wall of the drum is formed with a plurality of longitudinally extending slots 30. The width of each slot measured over the outer circumference of the drum is no greater, and preferably somewhat less, than the thickness of each individual layer 13 to 16, and the distance between one slot and the next is such that, when the drum 24 is rotated, the leading edge of one slot will arrive at one of the outer faces of the combined layers as the trailing edge of the preceding slot leaves the opposite outer face of the combined layers. In other words, the width of the material of the drum lying between adjacent slots is the same as the combined thicknesses of the layers 13 to 16.

The drum 24 contains a source of illumination. To this end there is provided an electric lamp which, in the embodiment illustrated, is shown to be a cold cathode tube 31 of looped form. The contact ends of the tube are supported in a connector 32 arranged outside the drum 24 and supported by a bracket 33 secured to the base of the casing 11, current for the tube being supplied by leads 34. From the connector the tube 31 extends through the open end 26 of the drum and so into the drum, the tube being arranged directly beneath the lower edges of the layers 13 to 16 and close to the upper part of the drum.

A shield 35 of horse-shoe shape in cross-section is provided for the part of the tube 31 lying within the drum 24, the shield extending out of the open end 26 of the drum 24 and being held in position by being secured to a bracket 36 mounted on the base of the casing 11. The shield is so disposed that it allows light rays from the tube 31 to pass upwardly in the direction of the lower edges of the layers 13 to 16 and prevents the light rays from spreading in other directions within the drum 24. The inner face of the shield may be polished to form a reflector.

For the purpose explained with reference to the construction illustrated in Figures 1 and 2, the side edges and the top edge of the layers 13 to 16 may be covered with opaque material which may be reflective. Moreover, the lower edges of the layers may be coloured, the colour being uniform or varying from one layer to the next.

When the drum 24 is rotated in the direction of the arrow in Figure 6 upwardly directed light rays from the tube 31 will pass through one of the slots 30 as this approaches the first layer 13 and when the slot comes opposite the lower edge of this layer, the rays will pass edgewise through the layer and thereby illuminate the matter 20 on this layer so that it can be seen through the viewing face of the assembly, the matter on the remaining layers being kept in shadow. As the slot progresses across the lower edges of the layers, the first layer 13 will be placed in shadow and the matter 21 on the second layer 14 will be illuminated, while the matter 22 and 23 on the third and fourth layers 15 and 16 respectively will continue to remain in shadow until their turn comes to be illuminated. Thus, illumination of one part only of the total subject-matter will take place at one time. During each illuminating step the masks 18 act to prevent light from the layer under illumination from passing into the next layer. The masks also act to afford a sharp cut-off when illumination changes from one layer to the next.

By suitably distributing the various parts of the total subject-matter between the various layers, an effect simulating animation can be produced, if this is the aim to be achieved. If the aim is to depict a subject in different colours, then the chief consideration for this will be to have the lower edges of the layers 13 to 16 differently coloured. It will be understood, of course, that the arrangement may be such that both animation and different colour effects can be produced at the same time.

It will be understood that the transparent layers 13 to 16 in the embodiment according to Figures 3 to 6 may be of different thicknesses instead of being of uniform thickness as shown. The use of varying thicknesses has the effect of varying the duration of each phase of illumination.

What I do claim and desire to obtain by Letters Patent of the United States of America, is:

1. In apparatus for producing visual indications comprising a stack of layers of transparent material disposed face-to-face, each layer bearing an indication capable of being made visible by edge-lighting of the layer, opaque shields interposed between successive layers and extending inwardly from one edge of the stack of layers a substantial distance leaving said indications visible, a rotatable hollow drum arranged adjacent the edge of said stack containing said shields with the axis of said drum parallel to said edge, said drum being opaque with a plurality of circumferentially spaced transparent openings extending lengthwise of the drum, a light source inside said drum and means for rotating said drum, said drum being sufficiently close to said shields that said openings channel light to a selected layer while the opaque portions of the drum between said openings in cooperation with said shields prevent light from going to other layers, whereby said layers are edge-lighted individually and sequentially as said drum rotates.

2. Apparatus according to claim 1, in which the width of each of said openings does not exceed the thickness of each of said layers.

3. Apparatus according to claim 1, in which the width of the opaque portions of said drum between said openings is not less than the combined thickness of said transparent layers.

4. In apparatus for producing an animated display, a plurality of superposed sheets of transparent material, means masking portions of said sheets, the superposed unmasked portions of said sheets being substantially coextensive and bearing indications made visible by edgewise lighting of said sheets, and means for edge-lighting said sheets one after another in predetermined sequence including means for determining the sequence of edge-lighting, and means for blocking the illumination of other sheets, the indications on superposed portions of said sheets being correlated so that the sequential lighting of said sheets produces the appearance of motion.

5. Apparatus according to claim 4, in which said sheets are of different thicknesses.

6. In apparatus for producing an animated display, a plurality of superposed sheets of transparent plastic material, means masking marginal portions of said sheets, the superposed unmasked portions of said sheets being substantially coextensive with one another bearing figures made visible by edgewise lighting of said sheets, and means for edge-lighting said sheets one after another in predetermined sequence including means for determining the sequence of edge-lighting, and means for blocking the illumination of other sheets, figures of underlying sheets, when edge-lighted, being visible through unlighted overlying sheets, the figures on superposed portions of said sheets being correlated so that the sequential lighting of said sheets produces the apearance of motion of the figures.

References Cited in the file of this patent

UNITED STATES PATENTS

| | | |
|---|---|---|
| 1,146,361 | Spencer | July 13, 1915 |
| 1,403,630 | Pyper | Jan. 17, 1922 |
| 1,707,965 | Scantlebury | Apr. 2, 1929 |
| 2,446,674 | Sproul | Aug. 10, 1948 |
| 2,507,909 | Kaysen | May 16, 1950 |
| 2,524,657 | Ford | Oct. 3, 1950 |